INVENTORS
BERNARD TISSERANT
JULIEN WUYTS

United States Patent Office 3,436,632
Patented Apr. 1, 1969

3,436,632
UNDULATOR FOR TRANSFORMING A DIRECT CURRENT INTO A UNIDIRECTIONAL PULSED CURRENT AND APPLICATIONS THEREOF
Bernard Tisserant, 85 Rue Bernard Gante, Villemonble, France, and Julien Wuyts, 1 Place Normandie, Sarcelles, France
Filed June 18, 1965, Ser. No. 465,039
Claims priority, application France, June 30, 1964, 980,137
Int. Cl. H01h 47/00, 51/34
U.S. Cl. 318—138
7 Claims

ABSTRACT OF THE DISCLOSURE

The present disclosure relates to a device for converting direct current into unidirectional pulsed current. A semiconductor thyratron, more commonly known as a silicon control rectifier, is pulsed on and off for gating the direct current to the load in the form of pulses. The silicon control rectifier is provided with a series capacitor and inductor which is connected in parallel with the silicon control rectifier. The series inductor and capacitor has such a resonant frequency as to assure the cut-off of the silicon control rectifier in the absence of gating pulses.

---

Figure 1:
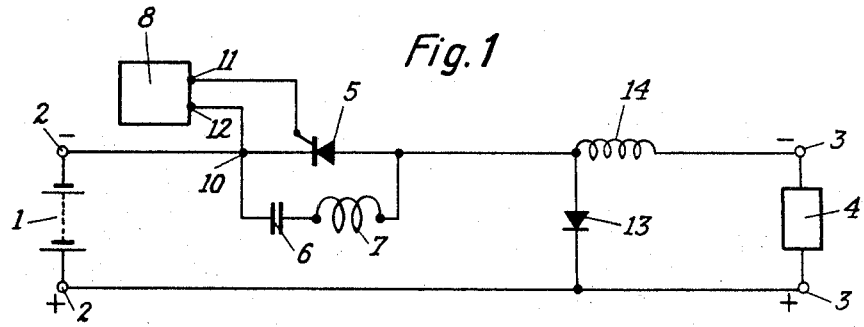

Our invention relates to a device acting as a pulsator and making it possible to transform a direct current (supplied by a substantially constant source of voltage, such as a cell, an accumulator, a battery) or a rectified current, into a unidirectional pulsed current. The pulsator in accordance with our invention further makes it possible to control manually or automatically the mean value of the pulsed current capable of being thus fed to a receiver. The pulsator is particularly suitable for control of vehicles powered by direct current electric motors.

Pulsators are already known which cut off the voltage supplied by a battery in a succession of pulses of which the frequency can be varied. These known devices, which use for instance semiconductor thyratrons silicon control rectifiers or the like, have however the disadvantage of comprising at least one second silicon control rectifier designed for cutting off the first. This results in heavy, complicated and expensive installations, with not really satisfactory efficiency and which furthermore do not permit automatic limiting of the current supplied for each control value.

One of the objects of our invention is to overcome these drawbacks.

According to the present invention there is provided a pulsator for supplying to a receiver a unidirectional pulsed current of controllable mean value from a source of direct current of substantially constant value, said pulsator comprising in the circuit connecting the source to the receiver, a semiconductor thyratron or a silicon control rectifier in series with said receiver, the said silicon control rectifier being connected to a generator of starting pulses of controllable frequency and being shunted by a circuit comprising an inductance and capacitor, in that it further comprises an inductive impedance in the utilization circuit and a diode for recuperating inductive energy, mounted in parallel with said receiver relatively to said source of direct current and in opposition therewith.

Preferably, the inductance-capacitor circuit connected to the terminals of the silicon control rectifier is so designed that the inverse current generated by the oscillating discharge from the capacitor arises after the silicon control rectifier's starting pulse and can last up to the instant of cutting-off of this silicon control rectifier. Preferably, the inductive impedance of the utilization circuit is advantageously designed in such a way as to supply to this circuit a current which is not zero during the space of time when the silicon control rectifier is cut out.

The pulsator may be used both with an open chain (manual control) and with a closed chain (automatic control). It is particularly useful for controlling traction motors.

Thus in the case of the control of a DC motor whose direction of rotation may be reversed by means of a reversing control system, the pulsator is associated with a control system fed by the armature of the DC motor and brought into operation when the control member of the reversing element passes through the stop, in order to prevent any feed of the silicon control rectifier in the reverse direction, while the armature is not at rest.

Further objects and features of our invention will be made apparent when the specification proceeds.

Figure 2A:
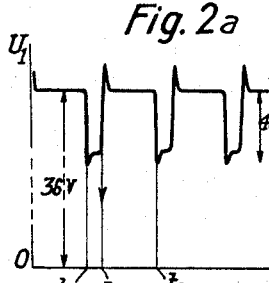
Figure 2B:
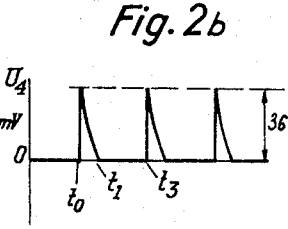
Figure 2C:
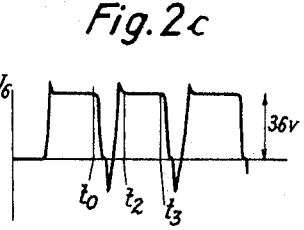
Figure 3A:
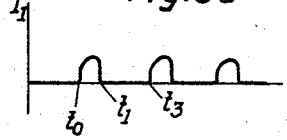
Figure 3B:
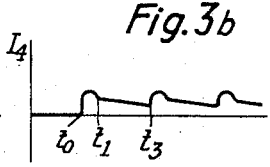
Figure 3C:
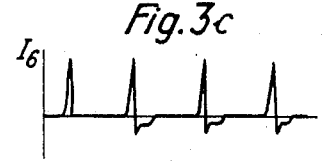
Figure 4:
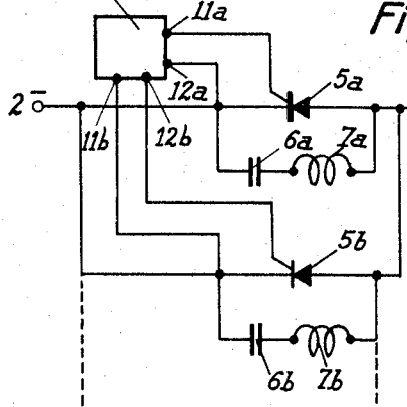
Figure 5:
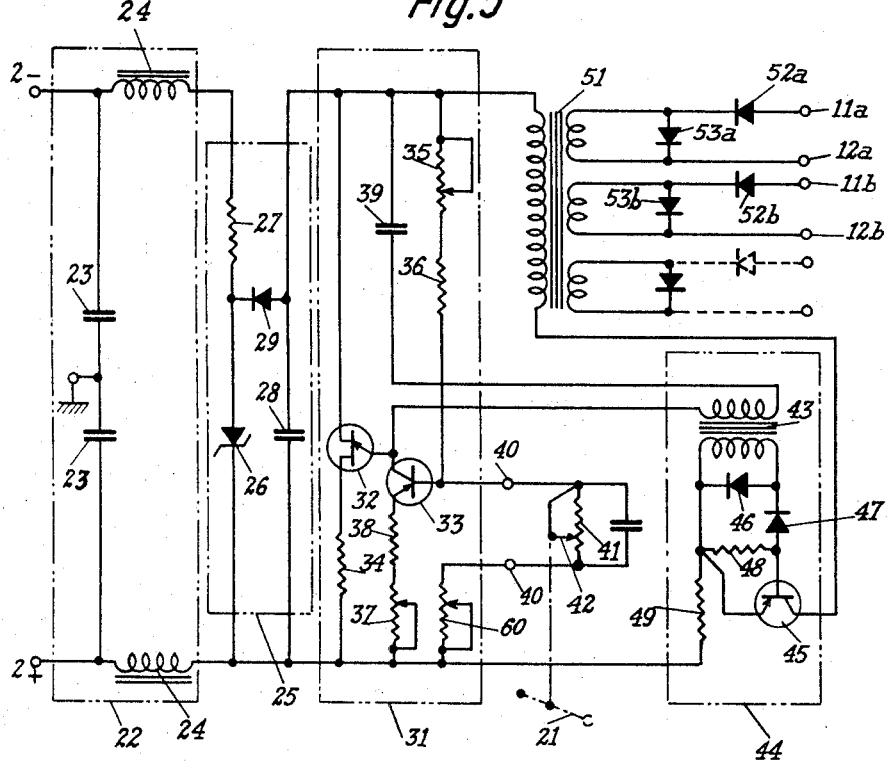
Figure 7:
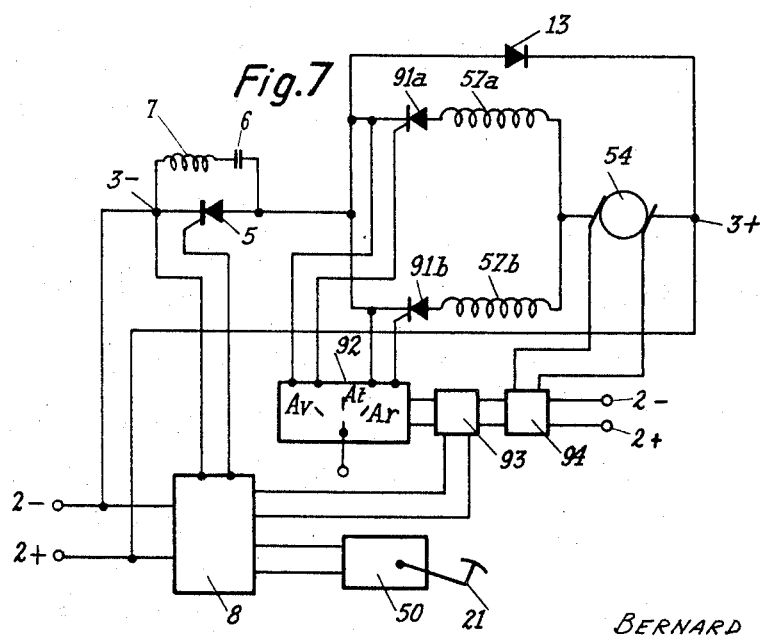
Figure 6:
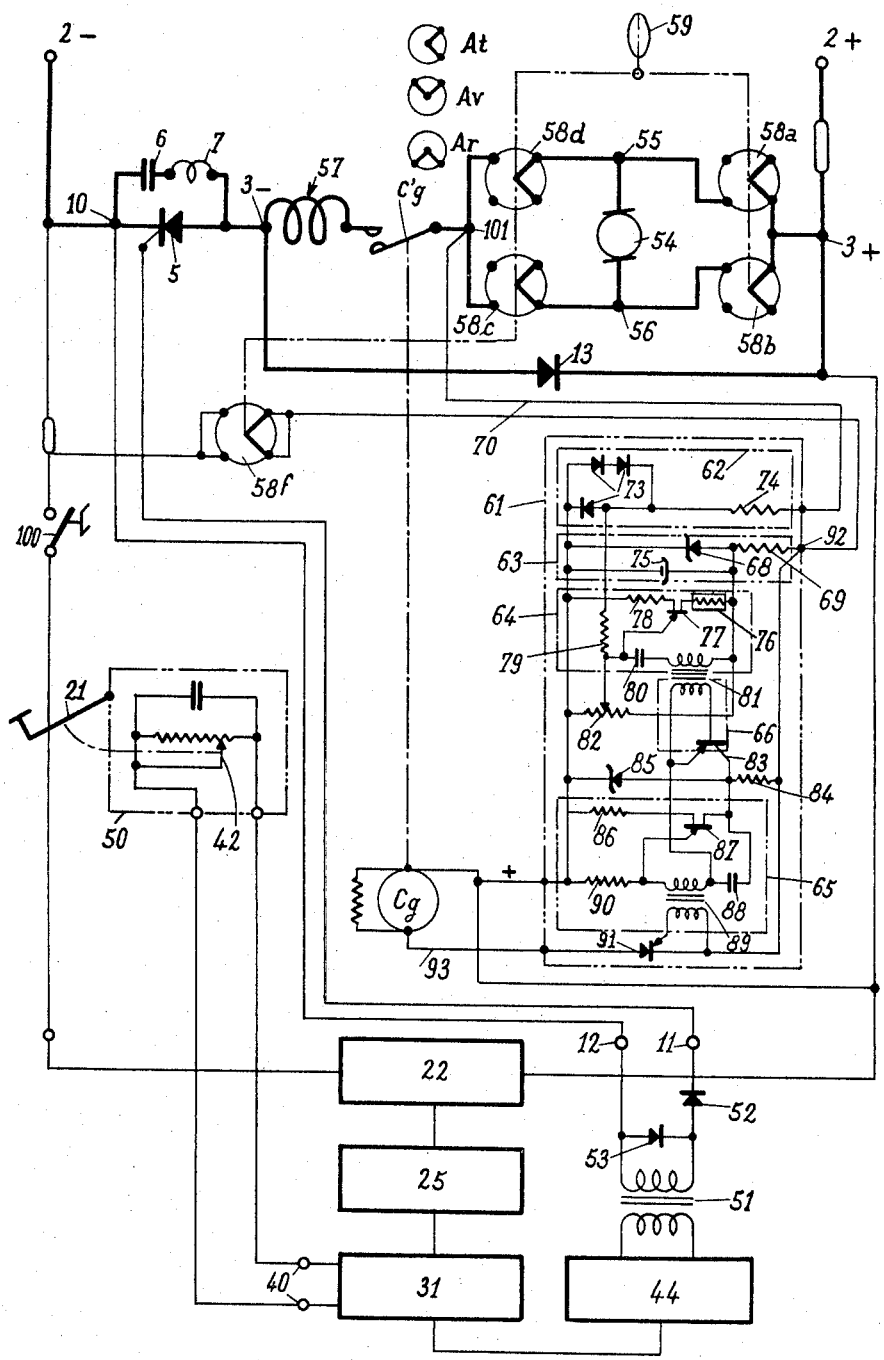

Specific embodiments of our invention will now be described by way of example with reference to the accompanying drawings in which:

FIGURE 1 is a simplified diagram of a pulsator.
FIGURES 2a, 2b, 2c are graphs of voltages during operation, these voltages being taken at various points of the preceding diagram.
FIGURES 3a, 3b, 3c are graphs of corresponding currents.
FIGURE 4 is a diagram of a current of the pulsator.
FIGURE 5 is the diagram of a pulse generator for the pulsator.
FIGURE 6 is a simplified drawing showing the application of our invention to the control of a series motor.
FIGURE 7 is a diagram of another application of our invention.

Referring to FIGURE 1 of the attached drawings there can be seen at 1 a source of direct current (an accumulator battery for instance). Between the terminals 2+ and 2− of the battery 1 and the terminals 3+ and 3− of the electric receiver or utilization member 4 (of any kind, such as for instance a series motor), is arranged the undulator in accordance with our invention. This comprises a semi-conductor silicon control rectifier 5, of silicon for instance, fitted in such a way that the current from the terminal 3− to the terminal 2− can pass through it when started.

The silicon control rectifier 5 is shunted by a static oscillating circuit of the inductance capacitance type designed as will be seen to permit its automatic cutting-off. This circuit consists essentially of a capacitor 6, for instance of metallized paper, in series with a damping inductance 7. The control electrode of the silicon control rectifier 5 is connected to an output terminal 11 of a generator 8 of periodic pulses intended for periodically triggering the thyratron 5. The frequency of the generator 8 can be controlled in dependence on the output required before being supplied of the receiver 4 by the source 1. The other terminal 12 of the generator 8 is connected at the common terminal 10 to the silicon control rectifier 5 and the capacitor 6.

The control of the frequency of recurrence of the generator 8 may be manual or automatic as will be seen later on, at the same time as a special embodiment of this generator 8 will be described.

The assembly further comprises, in parallel with the utilization member, a diode 13 termed the "recuperation diode" which opposes the passage of current from the battery 1.

An inductive impedance 14 is further arranged in the part of the circuit between the diode 13 and the receiver 4. The impedance 14 may consist, according to the characteristics of the circuit, of the actual inductance of the receiver 4, or the inductance distributed over the conductors connecting the diode 13 to this load, or again by an inductance inserted in this circuit.

The undulator thus arranged operates as follows:

The starting pulse generator 8, being supposed to be adjusted to a given frequency depending on the maximum power which is to be supplied to the receiver 4, the following succession of stages is produced:

The silicon control rectifier 5 being supposed to be shut-off the capacitor 6 is charged to a voltage ($U_6 = +36$ v. for instance) which is the voltage of the battery 1 (see FIGURES 2b and 2c which correspond, like the analogous figures, to oscillographic determinations).

In fact, as the silicon control rectifier 5 is shut-off, a damped circuit is obtained at the terminals of the battery 1 in which the resistive part of the impedance corresponds to the resistance of the receiver 4, to the ohmic value of the inductance 7 and to that of the connecting conductors.

The inductive impedance is that of the inductance 14, possibly that of the receiver 4 when this latter includes coils and the distributed inductance of the conductors.

Finally the capacitive impedance comes essentially from the capacitor 6.

The voltage at the terminals of the receiver 4 is zero.

When the generator 8 which acts as a time base delivers at the instant $t_0$ a starting pulse, the current of the battery 1 passes through the receiver 4.

The capacitor 6 is short-circuited by the silicon control rectifier 5, discharges (FIGURE 2c) and the direction of the discharge current is such that it contributes to the free starting of this silicon control rectifier.

As the discharge of the capacitor 6 takes place under oscillatory conditions, the voltage $U_6$ (and consequently that prevailing at the terminals of the thyratron 5) passes through 0 and then reverses, in respect of the battery 1.

The capacitor 6 then becomes a series generator whose voltage is added to that of the battery 1. The current in the silicon control rectifier 5 falls to zero and remains evanescent for a certain time. The period of the oscillating circuit 6, 7 is such that this time is greater than the cut-off time of the silicon control rectifier 5, this latter becomes nonconductive and remains in this condition while awaiting a fresh starting pulse. The capacitor 6 being again connected to the terminals of the battery 1 is again charged according to the polarity of this latter, through the receiver 4.

The charge terminates at the instant $t_0$ (FIGURE 2c).

The object of the inductance 7, in this oscillatory condition, is to supply to the circuit the necessary time constant and to avoid the peak energy of the capacitor 6 discharging abruptly through the silicon control rectifier 5 which might damage it.

From the use point of view, it can be seen that during the conductive period $t_0$–$t_1$ of the silicon control rectifier 5, the voltage $U_4$ at the terminals of the receiver 4 is positive, so that a peak current $I_4$ (FIGURE 3b) passes through this receiver during the same time interval.

When the voltage cancels out at the terminals of the receiver 4 at the instant $t_1$ the inductance 14 gives up in the form of current the energy which it has stored. This current passes through the recuperation diode 13 to the terminal 3+. There is thus maintained in the receiver 4 a circulation in the same direction as that prevailing when the battery 1 feeds current into this receiver. As can be seen in FIGURE 3b this current $I_4$ which passes during the period $t_1$–$t_3$ separating two startings of the silicon control rectifier, tends to decrease, but it does not fall to zero, so that a current of decreasing intensity, but not a zero current continues to pass through the receiver 4.

It can be seen in FIGURE 2a that the drop in tension at the terminals of the battery 1 during the conductive period of the silicon control rectifier 5 is small (400 mv./36 v.). Corresponding current points have been shown in accordance with $I_1$ (FIGURE 3a). It is found that this current periodically falls to zero between $t_1$ and $t_3$ although this is not the case in the receiver 4.

At $I_6$ are also shown the variations in current at the terminals of the capacitor 6.

It can be seen that during operation the recuperation diode 13 is intended to permit a current which is undulated but not chopped to pass through the receiver 4. It also avoids overvoltages at the terminals of the silicon control rectifier 5.

If it is desired to increase the energy supplied to the receiver, the starting pulse frequency supplied by the source 8 is increased, which amounts to reducing the period $t_0$–$t_3$. It will be understood that in this case the current peaks $I_4$ will be closer together the higher the frequency.

The undulator in accordance with the invention is thus such that if control impulses coming from the generator 8 cease abruptly, the end of the chain of operations corresponds to the recharging of the capacitor 6 after the shutting off of the silicon control rectifier 5. This arrangement is a very clear safety factor by comparison with prior devices using a second silicon control rectifier for the cutting off. In fact in this latter arrangement, when the pulses are stopped, the second silicon control rectifier may remain conductive and the source 1 then remains permanently connected to the terminals of the receiver 4 which might be dangerous.

In the case where the undulator is used for controlling an electric motor, it is self-restrictive of current and hence of torque, which avoids any current peak supplied by the source 1 and increases the life of the latter.

If the receiver 4 is an electric motor a given speed of the motor corresponds to a given pulse frequency. If the latter is abruptly shut off on stopping, its inductance decreases because the iron is saturated and the time constant of the charge of the capacitor 6 also decreases. The capacitor 6 is therefore charged more quickly.

By contrast, the time constant of discharge remains unchanged. The only difference is that the silicon control rectifier 5 calls for a greater shut-off voltage because its direct current has increased by virtue of the decrease in the counter-electromotive force of the motor, which is possible because the capacitor 6 may reach substantially the same voltage in reverse as that of the battery 1 during its first discharge alternation.

A new equilibrium is thus reached. Since neither the frequency nor the discharge time constant has changed, the current assumes a new equilibrium value and remains at this.

The value of the maximum current with the motor shut-off therefore depends, for a given source of direct current, solely on the strongest recurrence frequency of the control impulses.

The undulator being self-limiting with regard to current without an auxiliary electronic member, a very high degree of safety is obtained for the system.

In short, the undulating device in accordance with the invention thus presents the following principal advantages:

It can operate with only a single silicon control rectifier.

This silicon control rectifier is self-shutting-off, so that in the case of accidental stopage of the control impulses, the pulsator always stops itself in a condition corresponding to the nonconductive state of the silicon control rectifier, so that a high degree of safety is obtained for the system.

For each control adjustment the pulsator is self-limiting as regards current.

Its cost price is particularly reduced, because of the use of a single silicon control rectifier because of the fact that the electronic control can be simplified and the various accesories may be considerably reduced, if the resistances and inductances are formed partly by those of the conductors and the receiver 4 (particularly when this latter is a motor).

If it is desired to control powers $n$ times greater than the capacity of a single silicon control rectifier 5, the invention provides (FIGURE 4) for connecting in parallel n silicon control rectifiers 5a, 5b, etc. having at their terminals n self-capacitances circuits 6a, 7a, 6b, 7b etc., and n recuperation diodes 13a, 13b etc.

The inductance 14 on the other hand may be common. The starting pulses are supplied by a common generator 8, connected to the different silicon control rectifiers through the secondary windings of a single pulse transformer (terminals 11a, 11b, 12a, 12b . . . ).

To ensure automatic control of the starting pulse frequency supplied by the generator 8 from a manual member for controlling the receiver conditions of operation, the invention provides for the preferred use of an assembly of the kind illustrated in FIGURE 5, in which this generator comprises a relaxation oscillator with a uni-junction transistor.

In FIGURE 5 is shown diagrammatically at 21 the pulse frequency control member. The member 21 may be for instance a speed control lever or pedal of an electric motor of the series type, representing the receiver 4.

The pulse generator 8 which is connected to the terminals 2+, 2−, and subjected to the voltage $U_1$ comprises an anti-overvoltage circuit 22 (capacitors 23 at the middle point connected to earth and shock inductances 24). The circuit 22 is intended to protect the transistor of the relaxation oscillator.

The circuit 22 is followed by a stabilization stage 25 comprising a Zener diode 26 with its resistor 27 and a peak-reducing capacitor 28 connected to the Zener diode circuit by a non-return diode 29.

The relaxation oscillator proper 31 comprises a unijunction transistor 32 and a silicon transistor 33. Associated with the transistor 32 is a biasing and stabilization resistor 34. The circuit of the transistor 33 includes biasing resistors 35, 36, an adjustable adaptation resistor 37 and a counterreaction and temperature correction resistor 38. To the transistors 32, 33 is attached a relaxation capacitor 39.

In the base-emitter circuit of the transistor 33 is provided an adjustable biasing resistor 60 in series with a potentiometer 41 whose slider 42 is controlled by the member 21. The slider of the potentiometer 41 makes it possible to regulate the relaxation frequency of the stage 31. The terminals connecting the potentiometer 41 to the relaxation circuit 31 are shown at 40.

The relaxation oscillator 31 is connected through a connecting transformer 43 to an amplifying stage 44 with a transistor 45 with which are associated two silicon diodes 46, 47. The stage 44 also includes a resistor 48 charging the diode 47 and a counterreaction and temperature-compensation resistor 49 (connected to the terminal 2+).

The output of the stage 44 is connected to the primary winding of a transformer 51 having as many secondary windings as there are provided silicon control rectifiers 5 for the undulator. These secondary windings respectively serve the terminals 11a, 12a, 11b, 12b etc., of the ignition circuits of these silicon control rectifiers, by means of the silicon diodes in parallel-series 52, 53.

The above control device works in the following way:

The transistor 33 whose resistance varies in dependence on the adjustment of the slider 42 makes it possible, by acting on the biasing of the unijunction transistor 32, to control the discharge pulse recurrence frequency of the capacitor 39. These discharge pulses are fed by the transformer 43 to the amplifying stage 44 which then feeds them to the transformer 51 which distributes them towards the silicon control rectifier or silicon control rectifiers 5.

In the version of the generator 8 illustrated in FIGURE 5, the base-emitter biasing of the transistor 33 is obtained in open chain by a manually controlled variable resistance. This arrangement is particularly suitable for the control of the speed of a motor, such as a traction motor.

However, it is also within the scope of the invention to control the recurrence-frequency enclosed chain. In this case, the control signal is an error signal emitted by a control system associated with an automatic control of speed, current, temperature etc.

An example of application using these two types of control in question will now be described.

The diagram in FIGURE 6 shows the application of the undulator in accordance with our invention to the feed of a series motor of the traction type for instance for accumulator maintenance trucks, rolling bridges or other mobile systems.

In this diagram like members to these in FIGURE 1 are given like references. Furthermore, the circuits through which heavy currents pass are shown in heavy lines.

The inductor 57 and the armature 54 of the motor are connected to the terminals 2+ and 2− of the source via a feeding circuit. Said feeding circuit comprises a silicon control rectifier 5, shunted by an oscillating circuit made of a capacitor 6 and an inductor 7, and a contact $C'g$ of a general contactor $Cg$. The feeding circuit also comprises switching means arranged to reverse the direction of rotation of the armature 54 by changing the connections between said inductor 57 and said armature 54. Said switching means comprise a reversing switch with followers 58a, 58b, 58c, 58d actuated by a control member with a hand wheel 59, with three positions: At stop, Av forward, Ar reverse.

Because of the inductor 57, the inductance 14 is no longer necessary. The omission of this is particularly advantageous.

In this arrangement there can also be seen at 21 the speed control pedal (accelerator) which actuates the slider 42 of the potentiometer 41 connected to the terminals 40 of the control relaxer 31 of the silicon control rectifier 5. The stage 31 and other stages of the generator 8 are only represented diagrammatically with the same overall references as in FIGURE 5.

In this version the silicon control rectifier 5 is mounted on a cooler which also serves the power diode 13, which is also of silicon. A diode 13 for the recuperation of the inductive energy is connected across the series combination of the inductor 57 and armature 54.

This assembly is remarkable for a purely electronic servo-control system, consisting of a unit 61 and making it impossible, when the motor is already rotating, to pass from forward speed to reverse speed until the angular speed of the motor has dropped below a predetermined value in the vicinity of zero.

This result is obtained by delaying the call-up of the general contactor $Cg$ for a period sufficient to permit the voltage to be read at the terminals of the armature 54 of the motor, this reading being transformed into a prohibition signal when the hypothetical circumstances above-mentioned occur.

For this purpose the unit 61 comprises:

A stage 62 supplying a polarized voltage threshold. This stage includes diodes 73 with opposed mounting, connected by the current limiting resistor 74 and by a conductor 70 to the terminal 101 provided between the contacts $C'g$ and the changeover circuit of the armature 54.

A stage 63 (Zener diode 68, electrolytic capacitor 75) supplying a stabilized current from the terminal 2− when it is connected to the corresponding conductor by means of the follower 58f of the hand-controlled change-over switch 59.

A stage 64 comprising a practically fixed high frequency relaxation oscillator having a frequency of the order of 10 kc./s. and including a capacitor 80 connected to the stage 62 and to the primary winding of a transformer 81. This stage is also used for reading the voltage threshold and for this purpose includes a uni-junction transistor 77 connected between two resistors 76, 78 and controlled by the capacitor 80.

A stage 65 generating retarded pulses designed to ignite the silicon control rectifier 91 controlling the coil of the contactor $Cg$.

An electronic switch stage 66 producing a short-circuit at the relaxation frequency of the stage 64. The unit 61 also includes various components which will be explained in the description which follows of the mode of operation.

With the change-over switch in the stop position A*t*, when the control lever 59 is placed in the A*v* or A*r* position, the release order from the general contactor C*g* is delayed by the delay system provided in stage 65 and which comprises a single relaxer with a uni-junction transistor 87 controlling through a transformer 89 a very low power silicon control rectifier 91 in series with C*g*.

When the general contact 100 is closed, the release order of the contactor C*g* is given through the follower 58*f* which, when it comes into the position A*v* or A*r*, places under tension via the terminal 92 the stage 63 and the resistor 84, this voltage being stabilized by the Zener diode 85, the + terminal being common to all the circuits and permanently connected to the 2+ pole.

As a result of the placing under tension, the capacitor 88 is charged according to a time constant (about 0.5 second) determined by its inherent capacity, by the impedance of the transformer 89 and by the resistor 90 mounted in series.

When the starting voltage of the uni-junction transistor 87 is reached, the capacitor 88 discharges into the primary winding of the transformer 89, the current being closed by the uni-junction transistor 87.

The secondary winding of the transformer 89 then transmits a control impulse to the silicon control rectifier 91 which becomes conductive and then permits feed to the contactor C*g*.

This delay is not disadvantageous when the carriage is at rest and is started, in view of its low value. On the other hand during running it makes it possible to ensure, as will be seen, the intervention of the control device to prevent an abrupt reversal of travel.

The unit 61 works, in fact, as follows: with the motor running the conductor 70 transmits the armature voltage to the stage 62 and the diodes 73 ensure the restriction of amplitude of this voltage to two different values depending on its polarity.

This voltage is transmitted by the resistor 79 to the relaxer stage 64 which is permantly maintained slightly below the relaxation threshold by the control potentiometer 82.

If the direction of rotation of the armature corresponds to that set by the manual change-over switch, 59, the relaxer 64 is shut out, the silicon control rectifier 91 passes and the contactor C*g* is excited.

The motor being thus in operation, if the position of the lever 59 is reversed, passing for instance from the position A*v* to the position A*r*, the silicon control rectifier 91 whose time constant is negligible, is cut out during the change-over of the follower 58*f*. Before the voltage of the capacitor 88 has reached the relaxation threshold of the stage 65, the reverse voltage transmitted by the stage 62 to the relaxer 64 causes the relaxation threshold in this latter to be passed. The stage 64 enters into relaxation at the frequency provided. This causes all-or-nothing conduction of the transistor 83 at the same frequency (10 kc./s. for instance). The transistor thus short-circuits at this frequency the capacitor 88 which cannot become charged. No control pulse is thus transmitted to the silicon control rectifier 91. Because of this the contactor C*g* cannot be fed with current, the contact C'*g* drops and remains open in spite of the order which has been given it.

It will be further noticed that if after an order for reversing the direction of travel a counter-order is given bringing the direction of travel back to the original condition, the arrangement is such that the prohibition device becomes immediately inoperative, which is favourable because there no longer exists any danger of deterioration or accident, the direction of rotation of the motor remaining the same.

The advantage of a purely static device of the kind in question is that it permits a very simple and rapid assembly in a very reduced space, without any mechanical transformation of the equipment.

In the embodiment in FIGURE 7 is shown the application of the invention to the control of a series motor comprising two inductors 57*a*, 57*b* with a common point, the armature being still designated 54.

The control of the speed is, as before, ensured by the silicon control rectifier 5 whose ignition electrodes are connected to a generator 8 of impulses whose frequency is controlled manually by the pedal or like element 21, connected to the potentiometric unit 50.

The two opposed-sense inductors 57*a*, 57*b* are connected in parallel in respect of the armature 54 and each in series with a silicon control rectifier 91*a*, 91*b* respectively. These silicon control rectifiers are selectively controlled by the lever 59 by means of an ignition unit 92, the feed of which from the terminals 2+, 2− is itself controlled by two electronic switches in series 93, 94 which form a logical stage of the NOR type. These switches are respectively controlled by the armature 54 of the motor and by the source of pulses 8 in such a way that if this armature is in rotation or if the source 8 emits impulses, the corresponding switches 94, 93 are opened.

In these circumstances the control of the direction of travel A*v*, A*r* by the lever 59 may become effective if no impulse is controlling the silicon control rectifier 5 and if the armature is immobile.

Of course the lever 59 and the pedal 21 may be replaced by devices controlled by external control signals. In this case the continuous variation speed, the automatic restriction of current, and the forward and reverse travel can be obtained by purely electronic means.

The invention is obviously applicable to the adjustable control of motors other than traction motors and can be used for instance for press motors, rolling material and so on.

In conclusion, the undulator provided by the invention is remarkable for the following features:

Automatic extinction of the system with a single semiconductor silicon control rectifier.

Automatic limiting current without any ancillary means.

Possibility of connecting silicon control rectifiers in parallel without increasing the volume of electronic control.

Possibility of obtaining chain operation controlled by the addition of a device giving an error signal depending on the quantity to be controlled.

Possibility of reversal of the direction of rotation of a motor without risk of damaging the motor coils.

Possibility of non-restarting servo-control by controlling the presence of voltage.

What we claim is:

1. In a control device for an electric direct current motor comprising an inductor and an armature serially conected, said device including in serial connection with said motor a current regulating pulsator comprising a silicon controlled rectifier and a quenching oscillatory circuit and variable frequency triggering means therefor, a contact, operated by an actuating coil of a contactor and switching means for reversing the direction of rotation of said motor by changing the connections between said armature and said inductor, an electronic servo-control system to inhibit the switching-on of said contactor if said switching means are operated to a position which does not correspnd to the actual direction of rotation of said motor and as long as the speed of said motor is greater than a predetermined value, said servo-control system including:

(a) sensing means to measure the back electromotive force generated in said armature, compare the polarity of said back EMF to the position of said switching means and issue a control signal as a function of the result of such measure and such comparison, and (b) operating means actuated by said control signal to prevent energization of said contactor coil when said control signal has a predetermined polarity until the magnitude of said control signal falls below a predetermined value.

2. A control device according to claim 1 wherein said sensing means comprise a sensing circuit energized by said motor armature via said switching means.

3. A control device according to claim 2 wherein said sensing circuit comprises non-linear elements to increase its sensitivity to the lower range of the back EMF generated in said armature.

4. A control device according to claim 1, wherein said operating means comprise a silicon controlled rectifier serially connected to said contactor coil, a control relaxer generating triggering pulses to trigger said silicon controlled rectifier and means to operate said control relaxer in relation with magnitude and polarity of said control signal.

5. A control device according to claim 4, wherein the control relaxer operating means comprise an electronic switch actuated by a pilot relaxer, the latter being controlled by said control signal.

6. A control device according to claim 5 wherein the relaxation frequency of said pilot relaxer is much larger than that of said control relaxer.

7. A control device according to claim 1 and applied to the control of a dual inductor motor, the two inductors genrating magnetic fields of opposite directions, wherein said switching means comprise silicon controlled rectifiers serially connected with each inductor and triggering means for said silicon controlled rectifiers controlled by both said triggering means of said pulsator and a sensing element energized by said motor armature.

References Cited

UNITED STATES PATENTS

| | | |
|---|---|---|
| 3,175,166 | 3/1965 | Bird. |
| 3,222,582 | 12/1965 | Heyman et al. |
| 3,242,352 | 3/1966 | Long. |
| 3,259,829 | 7/1966 | Feth. |
| 3,277,949 | 10/1966 | Walbridge. |
| 3,300,656 | 1/1967 | Meier et al. |
| 3,008,074 | 11/1961 | Gregory _____ 318—284 |
| 1,591,250 | 7/1926 | Duyne _____ 318—284 |
| 3,230,435 | 1/1966 | Andrews _____ 318—284 |
| 3,319,144 | 5/1967 | Clark _____ 318—284 |

ORIS L. RADER, *Primary Examiner.*

G. SIMMONS, *Assistant Examiner.*

U.S. Cl. X.R.

318—284, 293, 345